United States Patent [19]

Hashimoto

[11] Patent Number: 5,499,102
[45] Date of Patent: Mar. 12, 1996

[54] DISPLAY DEVICE FOR VIDEOCASSETTE RECORDER RECORDING RESERVATIONS

[75] Inventor: Kazuo Hashimoto, Tokyo, Japan

[73] Assignee: Hashimoto Corporation, Tokyo, Japan

[21] Appl. No.: 95,441

[22] Filed: Jul. 23, 1993

[30] Foreign Application Priority Data

Jul. 27, 1992 [JP] Japan ................. 4-218716

[51] Int. Cl.$^6$ ................................. H04N 5/76
[52] U.S. Cl. ........................... 358/335; 360/33.1
[58] Field of Search ..................... 358/335, 310; 360/33.1, 35.1; 348/731, 738, 734; 455/179.1, 185.1, 186.1, 186.2; H04N 5/76, 5/78, 9/79, 5/781, 5/782, 5/92, 5/783, 5/44, 5/50

[56] References Cited

U.S. PATENT DOCUMENTS

| | | | |
|---|---|---|---|
| 4,641,205 | 2/1987 | Beyers, Jr. ................. | 358/335 |
| 4,706,121 | 11/1987 | Young ..................... | 455/186.1 |
| 4,755,883 | 7/1988 | Uehira .................... | 358/335 |
| 4,879,611 | 11/1989 | Fukui et al. .............. | 358/335 |
| 5,056,070 | 10/1991 | Shibuya et al. ............ | 360/33.1 |
| 5,335,079 | 8/1994 | Yuen et al. ............... | 358/335 |

FOREIGN PATENT DOCUMENTS

| | | |
|---|---|---|
| 0322909 | 5/1989 | European Pat. Off. . |
| 2208142 | 1/1989 | United Kingdom . |

Primary Examiner—Thai Q. Tran
Attorney, Agent, or Firm—Lowe, Price, LeBlanc & Becker

[57] ABSTRACT

A device which allows a user to enter TV program recording reservations into a VCR memory and record the TV programs on videotape based on the reservations. This device is also capable of distinguishing between reservation data for TV programs which have been recorded and those which have not. TV program reservation data may be entered via keyboard 10 or remotely using telephone set 1. At the time of recording of a reserved TV program, a mark indicating that the recording has been performed is stored in RAM along with the data for that reservation and this mark is stored for a prescribed period of time. When review button 10-2 is pressed, TV program reservation data is displayed on LCD 14. The display changes depending on whether or not the above-mentioned mark is stored in RAM and it is thus possible for a user to determine whether the reserved TV program has been recorded.

3 Claims, 8 Drawing Sheets

Fig. 7

| ADDRESS | RAM | | |
|---|---|---|---|
| n | 0 | 1 | RESERVATION SEQUENCE NUMBER |
| n + 1 | 0 | 0 | "ONCE" CODE |
| n + 2 | 1 | 0 | CHANNEL (10 CH) |
| n + 3 | 0 | 1 | RECORDING START TIME (MONTH) |
| n + 4 | 0 | 4 | RECORDING START TIME (DAY) |
| n + 5 | 2 | 0 | RECORDING START TIME (HOUR) |
| n + 6 | 0 | 0 | RECORDING START TIME (MINUTE) |
| n + 7 | 2 | 0 | LENGTH OF RECORDING TIME |
| n + 8 | 0 | 2 | RESERVATION SEQUENCE NUMBER |
| n + 9 | 0 | 2 | "WEEKLY" CODE |
| n + 10 | 0 | 3 | CHANNEL |
| n + 11 | 0 | 1 | RECORDING START TIME (MONTH) |
| n + 12 | 0 | 4 | RECORDING START TIME (DAY) |
| n + 13 | 1 | 8 | RECORDING START TIME (HOUR) |
| n + 14 | 0 | 0 | RECORDING START TIME (MINUTE) |
| n + 15 | 2 | 0 | LENGTH OF RECORDING TIME |

Fig. 8

| | | |
|---|---|---|
| "ONCE" CODE | 0 | 0 |
| "DAILY" CODE | 0 | 1 |
| "WEEKLY" CODE | 0 | 2 |

Fig. 9

| RESERVATION KEYBOARD | REMOTE CONTROL SIGNAL |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 0 |
| ONCE | # |
| DAILY | ## |
| WEEKLY | # ## |
| CANCEL | * |
| REVIEW | # # # # → # |

DISPLAY DEVICE FOR VIDEOCASSETTE RECORDER RECORDING RESERVATIONS

BACKGROUND OF THE INVENTION

The present invention relates to a device which allows the user to enter television program recording reservations into the VCR at home or by remote control operation from outside the house and alphanumerically displays the reservation data concerning the programs, which have been recorded on the videotape in accordance with the reservations, before playing back.

The technique of entering TV program reservations at home or remotely is known art. However, until the present there have been no devices to display the reservation data for the programs which have been recorded on the videotape in accordance with the reservations.

SUMMARY OF THE INVENTION

The present invention is directed to provide a means which is able to select from all reservation data only that data which was utilized in the recording of TV programs and to display that data after the TV programs have been recorded on the above-mentioned videotape.

In the above-described device of the present invention, whenever TV programs are recorded on a VCR in accordance with TV program reservation data entered in the VCR's memory, a mark indicating that the recording was performed ("recording performed" mark) is added to the reservation data. If the reservation data is for a one-time recording, the data and the mark are erased after a prescribed length of time (for example, 24 hours). On the other hand, if the reservation is required every day or every week, only the mark but not the data is erased after the prescribed length of time. Within the prescribed time period, therefore, it is possible to distinguish and display the reservation data for the TV programs which had been recorded.

Alternatively, whenever television programs are recorded on videotape in accordance with reservation data, a count of the number of recordings performed is stored in the memory and a part of the reservation data is recorded on the videotape. Therefore, it is possible for the data representing the reservations which have been recorded to be selected and displayed well beyond the above-mentioned prescribed time limit. When a TV program which has already been recorded on the videotape is replayed, the reservation data will be detected, thus causing the abovementioned count to be decremented by one. When the count for a one-time recording becomes zero as a result of the count being decremented during playback, the reservation data for that recording is erased from the memory.

BRIEF DESCRIPTION OF THE DRAWINGS

FIG. 7 is a table showing reservation data stored in a RAM.

FIG. 8 is a table showing codes for reservation modes, such as "once," "daily," and "weekly."

FIG. 9 is a table comparing reservation keyboard and remote control signals.

Figure 1:
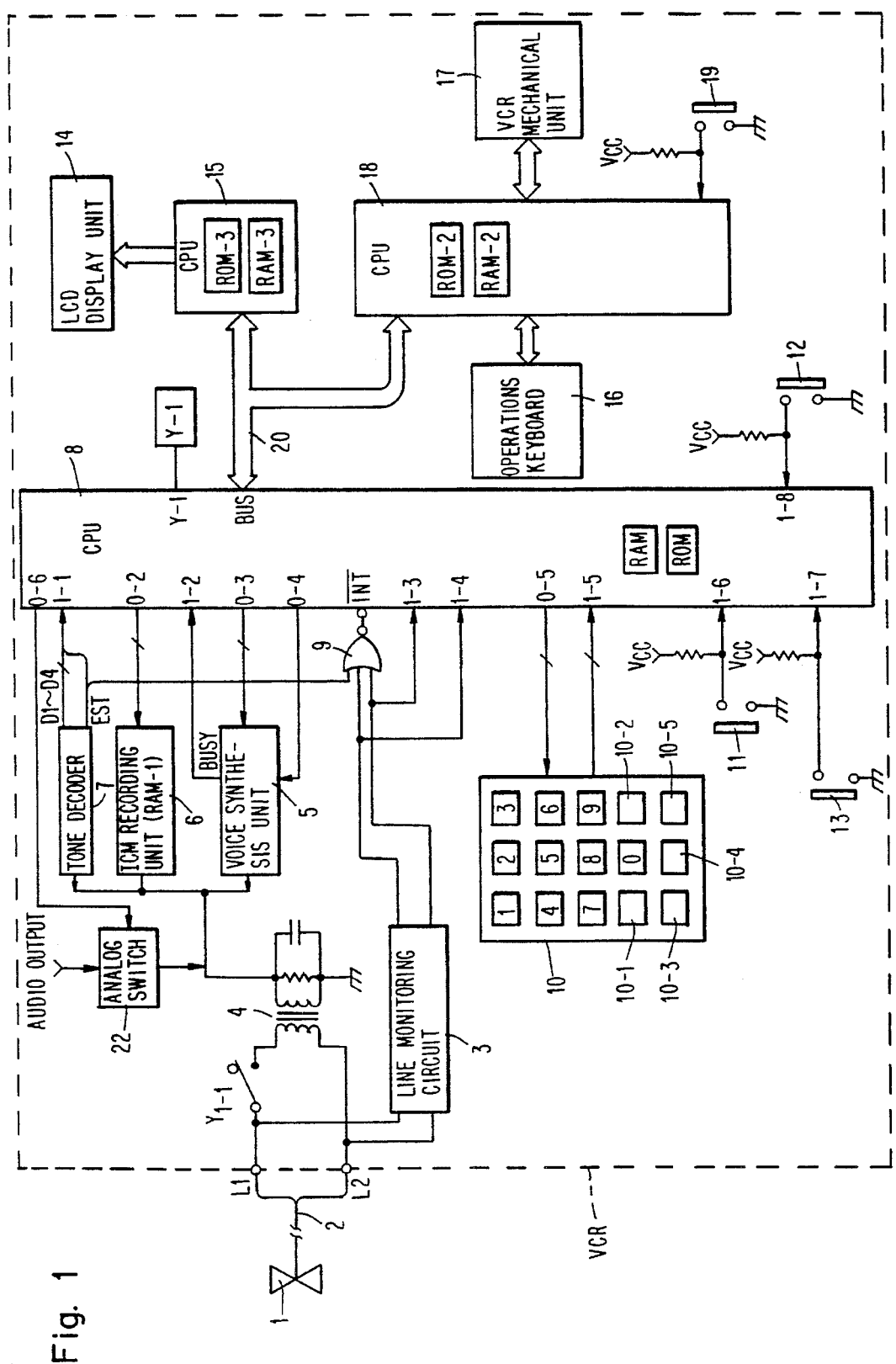
FIG. 1 is a block diagram showing one embodiment of the present invention.
Figure 2:
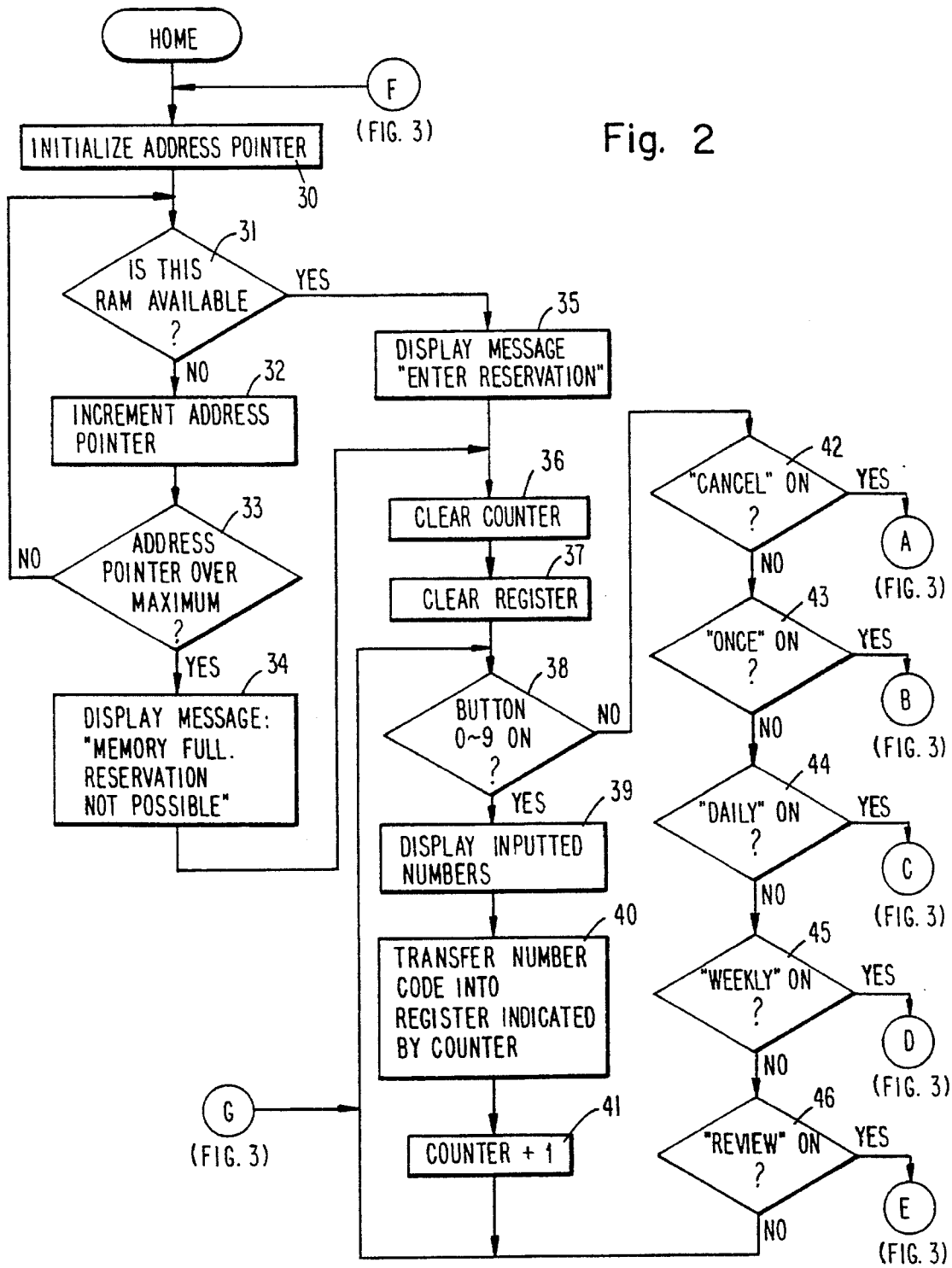
FIG. 2 is a flowchart showing operations which take place when TV program reservations are entered into a VCR by manual operation.
Figure 3:
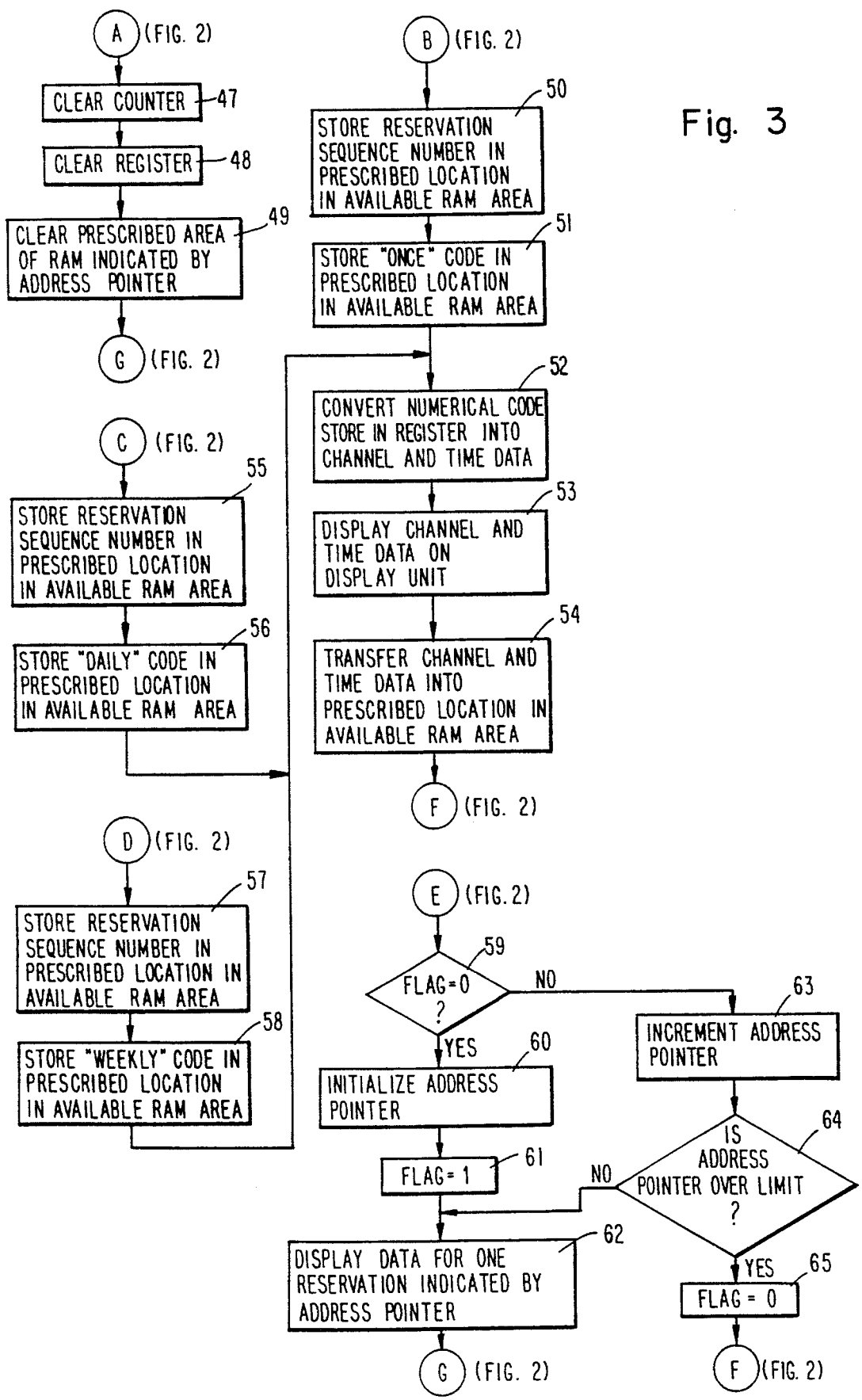
FIG. 3 is a flowchart showing operations which take place when TV program reservations are entered into a VCR by manual operation.

[Legend]
1. Telephone set
2. Telephone line
3. Line monitoring circuit
4. Line transformer
5. Voice synthesizing unit
6. ICM recording unit
7. Tone decoder
8. Microprocessor
9. NOR gate
10. Keyboard
11. "Enter reservation" button
12. "Execute reservation" button
13. "Absent" button
14. Liquid crystal display (LCD) unit
15. Microprocessor
16. Keyboard for operating VCR
17. VCR mechanism
18. Microprocessor
19. Button for displaying amount of remaining tape

PREFERRED EMBODIMENTS OF THE INVENTION

FIG. 1 is a block diagram of an embodiment of the present invention which shows only the major components. Number 1 represents an outside telephone. Number 2 represents a telephone line. Reference symbol VCR represents a videocassette recorder comprising the components described below. Number 3 represents a line monitoring circuit which detects a voltage change on the telephone line which occurs when a ringing signal is detected or when the caller places telephone 1 on-hook. Number 4 is a line transformer which operably connects the telephone line and the present device. Number 5 is a voice synthesizing unit used for transmitting, among other things, the following by voice synthesis: an outgoing message in response to an incoming call; operating instructions for performing television program reservations on the present device by means of telephone 1; and data concerning reservations which have been made.

Number 6 is an ICM recording unit for recording incoming messages from a caller. Those messages are recorded in RAM-1. Number 7 is a tone decoder for decoding DTMF tones which are remote control signals sent by the caller. Number 8 is a one-chip microprocessor (CPU), wherein I-1 through I-8 are input ports; 0-1 through 0-6, output ports; and INT is an interrupt terminal.

Also located in Number 8 is terminal "BUS," which serves as an input/output terminal for conductors, such as data bus, address bus, write conductor and readout conductor. These conductors are used for transmission and reception of data to and from the other CPUs (CPU15 and CPU18) via bus line 20. Also built into Number 8 are ROM containing the control program and RAM into which the television program recording reservation data is stored.

Number 10 is a keyboard which is used for entering TV program reservations while at home. This keyboard has pushbuttons labeled 0 through 9 for entering numbers. Also, it has a "cancel" button 10-1 for canceling reservations. Number 10-2 is a "review" button for reviewing the above-mentioned reservation data on LCD unit 14. Number 10-3 is a "weekly" button for entering a reservation for the same time every week. Number 10-4 is a "once" button for making a one-time recording. Number 10-5 is a "daily" button which is for recording at the same time every day from Monday through Friday.

Number 11 is a "enter reservation" button which must be pressed before entering TV program recording reservations using the above-mentioned keyboard 10. Number 12 is an "execute reservation" button (usually called the "timer recording" button) which is pressed when the user wants to execute the recording of already entered TV program reservations. Number 13 is the "absent" button which is pressed in order to set the VCR to "absent" mode, in which mode television program reservations are entered via telephone set 1. Relay Y-1, which is load on output port O-1, is used for engaging the telephone line and has contact y1-1. The above-described components are controlled by CPU8 as shown in the figure.

Number 14 is a liquid crystal display unit (LCD). Number 15 is a microprocessor (CPU) which performs the steps necessary for displaying data from CPU8 and CPU18. The data from CPU8 and CPU18 represents television program recording reservations, the various operating modes of the VCR, and the like.

Number 16 is a keyboard used to operate the VCR. Buttons include, for example, "play" and "rewind." Number 17 is the VCR mechanism. Number 18 is a microprocessor (CPU) used for controlling the above-mentioned keyboard 16 and VCR mechanism 17. Number 19 is a button for displaying the amount of remaining tape. The technique of displaying the amount of remaining tape is known art.

Next, the various operations will be explained in detail with reference to the flowcharts of FIGS. 2 through 6.
1. Entering Television Program Recording Reservations at Home using Keyboard 10

First, the "enter reservation" button 11 is pressed. The depression of button 11 is detected by the main program (not shown), which calls the subroutine "HOME" shown in FIG. 2. The address pointer is initialized at Step 30. The address pointer indicates the RAM address in which the television program recording reservation data (channel, recording start time, recording length, etc.) is stored (refer to FIG. 7).

Next, a test consisting of the loop of Steps 31 through 33 takes place to determine if RAM is available to store new television program recording reservations. If there is available RAM, Step 31 becomes affirmative and the program advances to Step 35 in which a message such as "Reservations are possible" is displayed on LCD unit 14 via bus line 0 and CPU15. If, on the other hand, there is no available RAM (this also means that the address pointer has exceeded the maximum value), Step 33 is affirmative and a message such as "Reservations are not possible" is displayed at the next Step 34. In such instances, the user, as will be described later, may press "review" button 10-2 in order to display the reservations stored in RAM one by one. By pressing "cancel" button 10-1, the user may cancel unwanted reservations. The user is then able to make new reservations.

When reservations are possible because there is available RAM, in this embodiment the user may enter a recording reservation code of several digits (G-code or the like) representing television program reservation data. For example, a G-code such as "79075" might represent a two-hour program on channel 10, beginning at 8:00 p.m. on Jan. 4, 1992. These G-codes (known in the U.S. as Plus-Codes) or the like can be found listed in newspapers and TV guides. The code is entered using buttons 0 through 9 located on the keyboard 10. As each digit is entered, Step 38 is affirmed and this digit is displayed on LCD unit 14 via bus line 20 and CPU15 at Step 39. The counter (not shown), which is built into CPU8, is cleared in Step 36 and the digit is transferred into the control register (not shown), which is also built into CPU8, in accordance with the value of the counter at Step 40. The counter is incremented by one at Step 41 and then returns to Step 38 in which a new digit can be entered.

After all the digits have been entered, the user has the option of pressing "once" button 10-4 for a one-time recording, "daily" button 10-5 for daily recording at the same time from Monday to Friday or "weekly" button 10-3 for recording at the same time every week. If, for example, the user presses the "once" button 10-4, Steps 38 and 42 are negative, but Step 43 is affirmative. In the next step, Step 50, a reservation sequence number is stored in a prescribed area of available RAM. (Note: although such a reservation sequence number makes control of the program easier, in this invention it is not absolutely essential).

Next, the operations will be described more concretely with reference to FIG. 7. In the above Step 31, the address pointer is pointing to the top of the available RAM. If there are no previous reservations, the address pointer will be pointing to address "n." In Step 50, the reservation sequence number "01" will be stored in the address! indicated by the address pointer (in this case "n"). Next, in Step 51 the "once" code represented by "00" (see FIG. 8) is stored in the address "n+1."

In Step 52, the TV program recording reservation code mentioned above is converted into channel and time data. For example, the above mentioned "79075" would be converted into data signifying a two-hour recording on channel 10, beginning at 20:00 on January 4th. At Step 53, the above channel and time data is displayed on LCD unit 14 via bus line 20 and CPU15.

At Step 54, the channel and time data is stored in the specified area of RAM indicated by the address pointer as shown in FIG. 7. But note that instead of using the length of recording time, it would be possible to use the actual ending time of the recording.

If the depression of "daily" button 10-5 is detected at Step 44, the "daily" code "01" shown in FIG. 8 would be stored in address "n+1" of FIG. 7. Alternatively, if the depression of "weekly" button 10-3 is detected at Step 45, the "weekly" code "02" would be stored in the address "n+1 ."

If it is necessary to cancel the reservation, "cancel" button 10-1 should be pressed. This causes Step 42 to be affirmative. The counter and register used in storing the above-mentioned numeric sequence are cleared (Steps 47 and 48). The area of RAM indicated by the address pointer, in the above example, "n" through "n+7," is cleared at Step 49 and the program returns to Step 38.

After a plurality of television program reservations have been made, "review" button 10-2 may be pressed in order to review the reservations on LCD unit 14 one by one. If Step 46, which tests for the pressing of the "review" button, is affirmative, the program advances to Step 59 of FIG. 3 (via flowchart connector A). First, a test is performed to determine whether "FLAG" is set to 37 0." In this case, since the "FLAG" had been set to "0" when the device was turned on, Step 59 is affirmative. Next, at Step 60, the address pointer is initialized to "n" and at Step 61, "FLAG" is set to 1. In Step 62, data for a TV program reservation indicated by the address pointer is displayed.

Referring to FIG. 7, the contents of "n" through "n+7" would be displayed as "Reservation Number 1: Channel 10, January 4, Sunday, 2 hours, one-time." In this situation, the program returns to Step 38 (via flowchart connector C). In order to display the next reservation, the "review" button is pressed again. This causes Steps 42, 43, 44, and 45 to all be negative, which causes the program to pass through to Step 46, which is affirmative. The program jumps to Step 59 of FIG. 53, which will be negative because "FLAG" is still set to "1." Next, in Step 63, the address pointer is incremented to the next reservation address "n+8" as shown in FIG. 7.

In Step 64 a test is performed to determine whether the address pointer has exceeded its maximum value. This embodiment is constructed to allow the storage of data for 16 reservations. If the address pointer is incremented but is still within 16 reservations, Step 64 is negative, thus causing the program to return to Step 62. In Step 62, the reservation data representing one reservation indicated by the address pointer is displayed. However, if the address pointer exceeds the maximum value or, if in other words the number of reservations exceeds 16, Step 64 is affirmative. Accordingly, "FLAG" is initialized in Step 65 and the program returns to Step 30 (via flowchart connector B).

An unwanted reservation can be deleted by pressing "cancel" button 10-1 while it is being displayed since the address pointer is indicating the corresponding data.

In the present embodiment, a small liquid crystal display unit is used for display purposes, but it is also possible to display all the reservations at one time on the television screen by using the well known superimposition technique.

2. Explanation of the Operation of VCR Reservation Recording

If the "execute reservation" button 12 (normally called the "timer" reservation button) of FIG. 1 is pressed, recording will begin of the appropriate channel when the starting time of the TV program recording reservation arrives.

Figure 4:
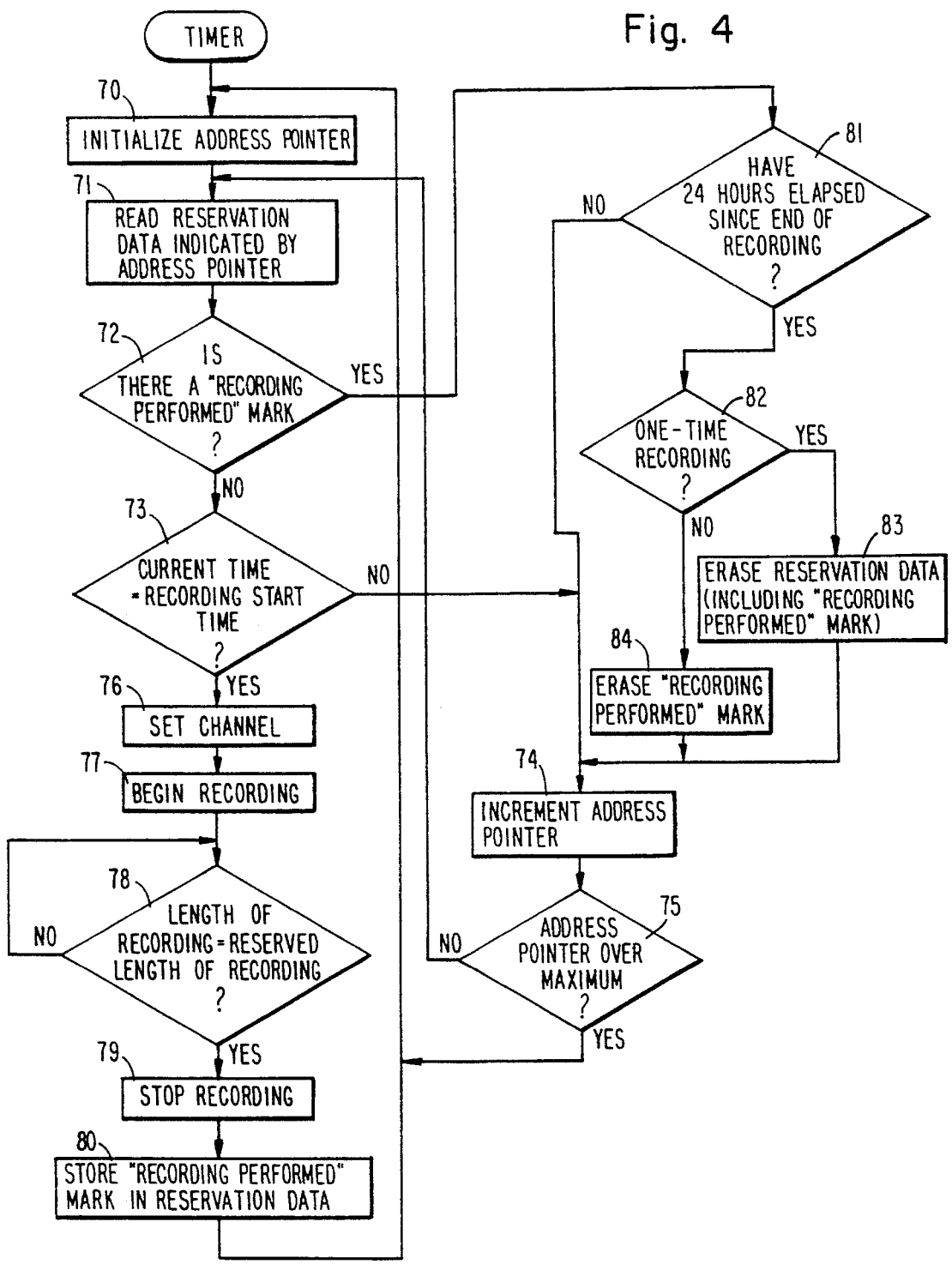
FIG. 4 is a flowchart showing VCR recording operations based on reservation data.

This operation will be described in detail with reference to the flowchart in FIG. 4. When the "execute reservation" button 12 is pressed, the subroutine "TIMER" shown in FIG. 4 is called. In Step 70, the previously described address pointer is initialized. Then, in Step 71, the program reads the reservation data that is indicated by the address pointer, in other words, the data or the first reservation (addresses "n" through "n+7" in FIG. 7).

Next, in Step 72, a test is performed to determine whether a mark representing the completion of recording has been added to the reservation data. This mark, henceforth called the "recording performed" mark, will be described later. When there is no such mark, Step 72 is negative. Then, at Step 73, a test takes place to determine whether the current time as provided by the clock built into CPU8 (not shown in the drawings) and the starting time of the first reservation are the same. If they are not, the address pointer is incremented at Step 74 and the program returns to Step 71 after passing through Step 75. At Step 71, the program reads the data for the next reservation.

In the above manner, the program successively reads the reservation data stored in RAM at Steps 71, 72, 73, 74 and 75, which form a loop. When the current time reaches the recording start time, Step 73 becomes affirmative. The tuner (not shown) is then set to the channel indicated in the reservation at Step 76, and recording begins at Step 77.

When the actual recorded time becomes equal to the reserved length of the recording, Step 78 becomes affirmative and the recording mode is cancelled in Step 79. In Step 80 the "recording performed" mark is added to reservation data for the recently recorded reservation. For a given reservation, the "recording performed" mark is stored, for example, as a binary "1" in the area containing the reservation's "once," "daily," or "weekly" code because the upper four bits of the area are not used. The "recording performed" mark is saved along with the expired reservation data for 24 hours regardless of the operational mode of the VCR, such as recording, playback and inoperation.

On the other hand, the above described Step 72 becomes negative when there is reservation data with the "recording performed" mark. Next, in Step 81, a test is performed to determine whether 24 hours have elapsed since the end of last reserved recording (the end of the recording is calculated from the reservation start time and length of recording).

If 24 hours have not elapsed since the end of the last recording, Step 81 is negative and the program moves to Step 74 which increments the address pointer. The program loops back to Step 71 via Steps 74 and 75. If 24 has elapsed, Step 81 is positive. At Step 82, a test takes place to determine whether the reservation is one-time reservation. If so, the reservation data is no longer needed, therefore the mark and the data itself are erased (Step 83). If the reservation is not a one-time reservation, only the "recording performed" mark is erased (Step 84).

Please note that although the above-described test to determine whether 24 hours have elapsed since the end of the last recording was described with respect to the "execute reservation" mode, the test still takes place during modes such as "play" or "rewind" as well as during inoperation. (Therefore, flowcharts for these modes have been omitted.)

3. Display of Reservation Data

Figure 5:
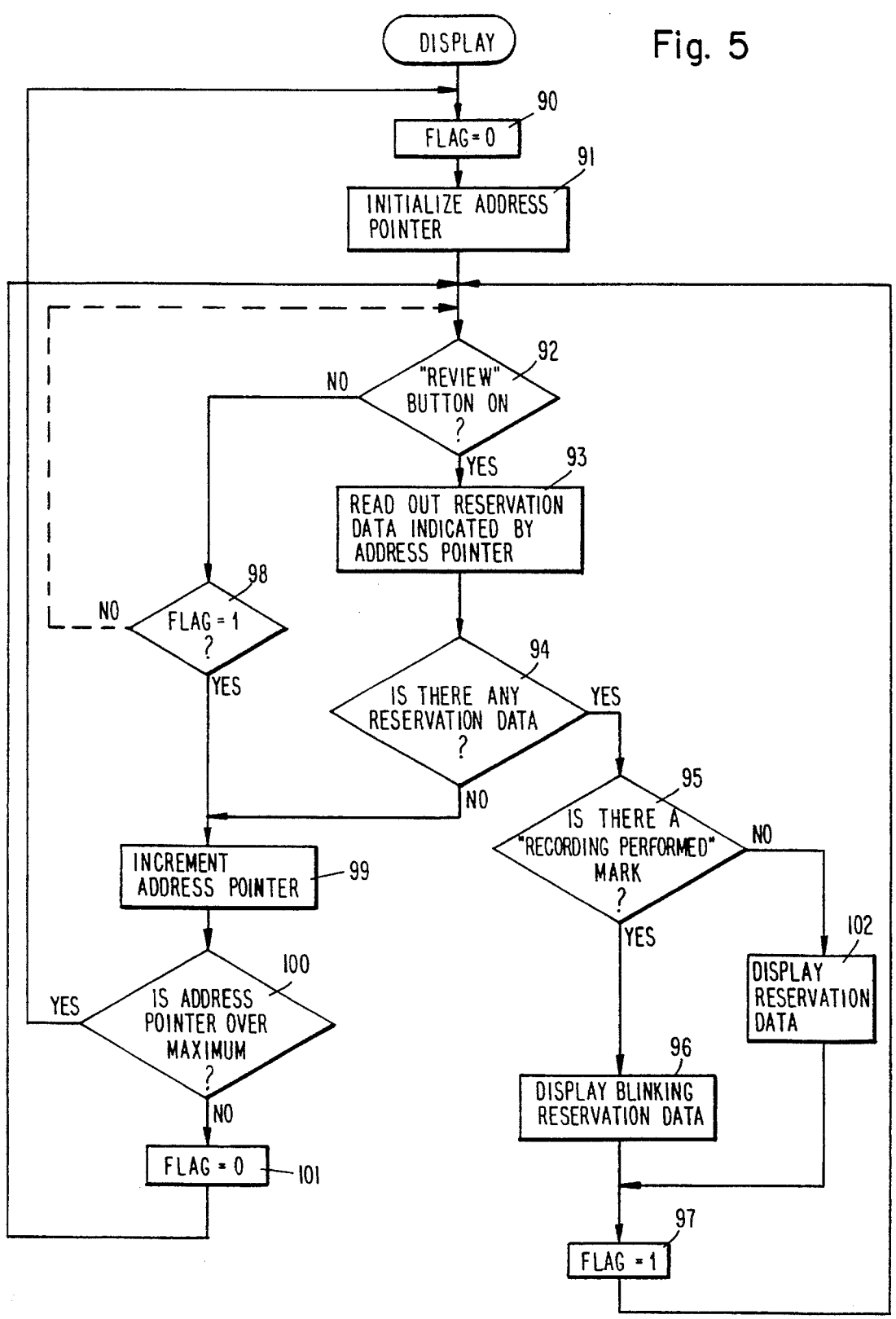
FIG. 5 is a flowchart showing display of reservation data.

Next, the display of reservation data will be described with reference to the flowchart of FIG. 5. The "review" button 10-2 is pressed in order to review the television program recording reservations on display unit 14. The pressing of this button calls the subroutine "DISPLAY" (shown in FIG. 5).

First, "FLAG" is reset to zero (Step 90) and the address pointer is initialized to the value of "n" (Step 91). Step 92 is affirmative. In Step 93 the reservation data corresponding to the address pointer is read out from RAM. This data consists of reservation sequence number, mode ("once," "daily," "weekly," etc.), recording starting time, and length of recording (or recording ending time).

If there is reservation data in RAM, Step 94 is affirmative. In Step 95, a test takes place to determine whether the reservation data includes the above-mentioned "recording performed" mark. If there is a "recording performed" mark, the program advances to Step 96 where the reservation data is shown on display unit 14. The display blinks on and off to indicate that the recording had already been performed. If there is no "recording performed" mark on the reservation data, Step 95 is negative. The program advances to Step 102 where the data is displayed without blinking to indicate that the recording is yet to be performed.

In the above manner, after the displaying of reservation data in Step 96 or Step 102, "FLAG" is set to "1" and the program returns to Step 92. The instant the user releases the "review" button, Step 92 becomes negative. Then, if "FLAG" is set to "1" (Step 98), then the address pointer is incremented (Step 99). As long as this address pointer does not exceed the maximum value, Step 100 is negative and "FLAG" is reset to "0" in Step 101 prior to returning to Step 92.

When the "review" button 10-2 is pressed again, Step 92 becomes affirmative and, as it is clear from the foregoing, the next reservation data would be displayed either blinking or without blinking depending on the presence of the "recording performed" mark. If there is no reservation data, Step 94 is negative and the address pointer is incremented in Step 99. In this manner, the next reservation can be read and displayed.

Also, although it isn't shown in the flowchart, in this embodiment, there is a four-second timer which is running during this "DISPLAY" subroutine. If the "review" button 10-2 is not pressed again within four seconds of the calling of the subroutine, the subroutine is exited. When the "review" button is not being pressed, the program will follow a loop indicated by the dotted line from Step 98 to Step 92 until the either the four seconds elapse or the "review" button is pressed again, whichever comes first.

4. Entering Television Program Reservation by Remote Control

The present invention is set to the "absent" mode by pressing "absent" button 13 shown in FIG. 1 or by calling up the invention by remote telephone I and letting the telephone line 2 ring 10 times. A caller's message can be recorded after the outgoing message is transmitted. At this time, if the code number transmitted by the caller matches the secret code number of the device, it is possible for the caller to make television program recording reservations using DTMF tones generated by the pushbutton operations of telephone set 1.

FIG. 9 shows a comparison of keyboard 10 and the remote control signals which based on DTMF tones generated by remote control operation of a telephone keypad. The details of the operation of such keys have been omitted.

5. Explanation of Operation of Second Embodiment which Copies Television Program Recording Reservation Data onto Videotape Next, the second embodiment of the present invention will be described with reference to the flowchart in FIG. 6. Recall that in the above-described first embodiment, reservation data which has the "recording performed" mark is erased from RAM after 24 hours. Therefore, if the user wanted to play the tape, he could verify the contents by displaying the recording reservation data providing that 24 hours have not elapsed since recording. However, if 24 hours had elapsed, then the reservation data for the performed recordings would have been deleted and thus display would be impossible.

In this second embodiment of the present invention, part or all of the reservation data (channel, beginning time, recording length) can be copied onto videotape. Furthermore, a counter representing the number of times a particular reservation has been recorded, henceforth called the "recording counter," is provided. This recording counter's value is stored in the RAM for that particular reservation. The recording counter is incremented by 1 for each recording and decremented by one each time the recording is played back. In the above manner, the invention makes it possible for a user to determine whether all recordings for a program have been viewed because if they have, the counter's value will be displayed as "0."

Figure 6:
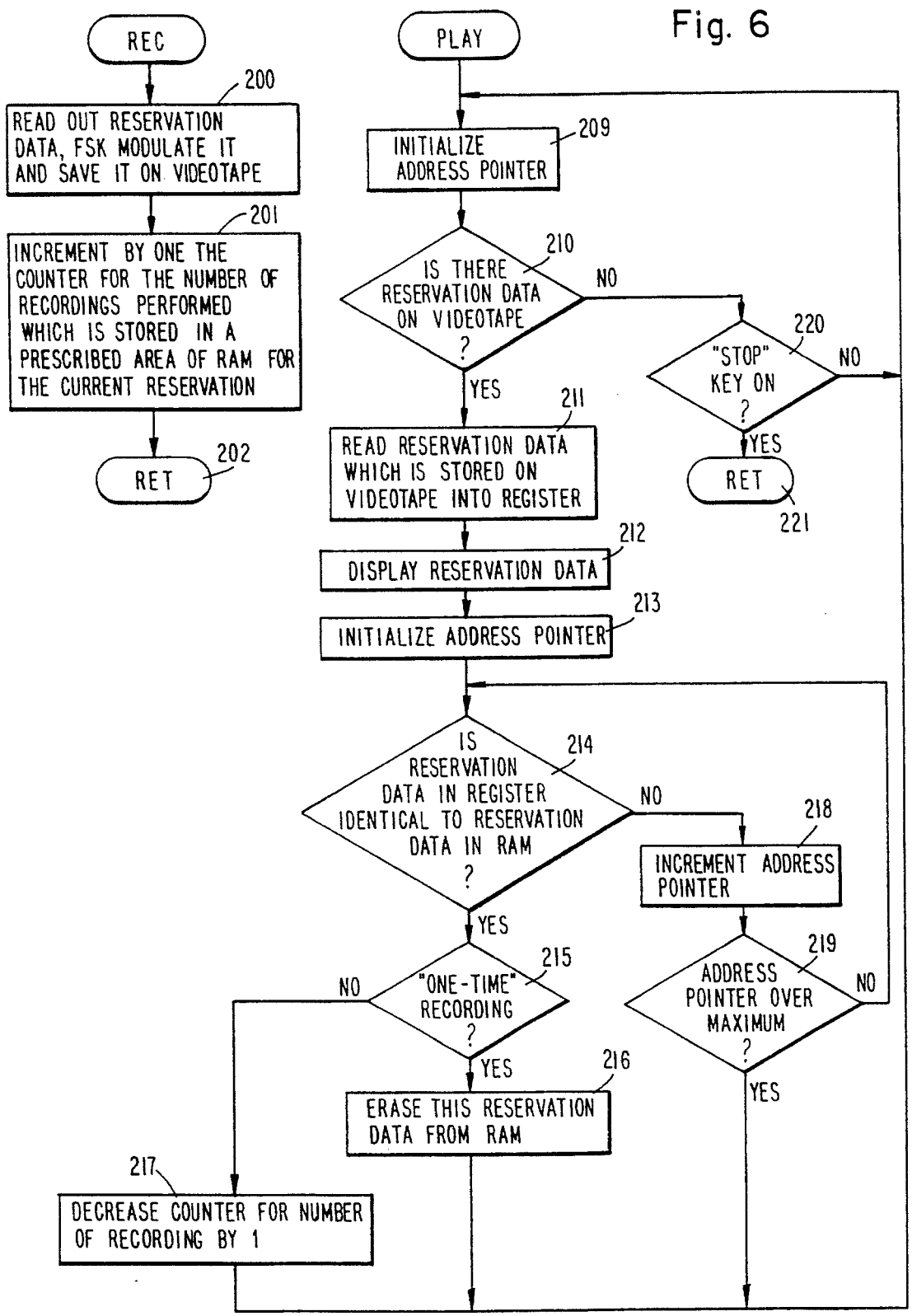
FIG. 6 is a flowchart for the second embodiment which shows storing of "recording counter" value in a RAM, recording of reservation data onto videotape, and decrementing of the recording counter value when the videotape is played.

Getting back to the flowchart, the subroutine "REC" of FIG. 6 is called when the VCR begins recording mode in accordance with the reservation data stored in RAM. This subroutine thus should be invoked after Step 77 in FIG. 4. In Step 200, the appropriate reservation data in RAM is read, FSK modulated and recorded on the audio track (or control track) of the videotape. As the techniques for recording reservation data on videotape and replaying it on a Braun tube is known art, such schematics will be omitted.

Next, the recording counter is incremented by 1 and stored in the reservation's prescribed area in RAM. This prescribed area could be the area in which the above-described "recording performed" mark is stored. Suppose, for example, that the first recording reservation has begun. Since it is the first recording, the recording counter will be "0" but in Step 201 it will be incremented to "1." At Step 202 this subroutine will be exited.

If the reservation data in RAM is displayed by pressing the "review" button, a message such as "No. 01 [01] 10 ch January 04 Sunday 20:00 2.0 hrs once" may be displayed, where "[01]" represents the value of the recording counter. Note that the recording counter for a one-time recording will never be higher than "1."

By pressing the above-mentioned "review" button it is possible to display all the recording reservations stored in RAM on a Braun tube (not shown) using the known technique of superimposition.

Next, when the above-described recordings are played back, the subroutine "PLAY" in FIG. 7 is called. After the above-mentioned address pointer is initialized (Step 209), a test is performed to determine whether any recording reservation data had been recorded on the videotape (Step 210). This is performed by testing the beginning of the reservation data. When Step 210 is affirmative, the reservation data is read from the videotape and stored in the register (not shown) of CPU8 for processing (Step 211).

Step 214 is a test to determine if the reservation data in the register of CPU8 matches the reservation data currently in RAM. By means of the loop consisting of Steps 214, 218 and 219, the RAM address pointer is successively incremented until the reservation data in the RAM is identical to the reservation data in the register. When the reservation data in RAM is found to be identical to the reservation data in the register, Step 214 is affirmative, Next, a test takes place at Step 215 to determine whether it was a one-time recording. If so, the one-time reservation data is erased as described earlier. On the other hand, if the recording was a "daily" or "weekly" recording reservation, Step 215 is negative and in the Step 217 the recording counter is decremented by "1."

Since it is possible that several television programs may be recorded on one tape, the program loops back to Step 210 via Step 209. When the "stop" key (not shown in drawings) is pressed, the VCR stops and the the subroutine is exited.

If the "review" button is pressed after the above videotape has been viewed, the data for the one-time reservations which have been recorded and viewed will not be displayed because the data was erased. The data for "daily" or "weekly" reservations which have been recorded and viewed will still be displayed. The recording counter will have been decremented by 1 if the recording had been played back. A recording counter value of "0" means that all recordings of the television program on that videotape have been viewed.

Although it is not shown in the flowcharts, it would be even more convenient to display the reservation data in the order that it is used (time sequence).

SCOPE AND RAMIFICATIONS

The present invention should not be limited to the above-described embodiments. By various alterations it is possible to obtain a number of embodiments which are still within the scope of its spirit. One example would be to provide a small alphabetic or Japanese character keyboard for the VCR so that additional information regarding the contents of the reservations (for example, "sports" or "movie") may also be stored and displayed.

When television programs are recorded onto videotape in accordance with the TV program recording reservation data that is stored in the memory of the VCR, the reservation data is preserved in memory for a prescribed length of time. After recording, a mark indicating that a reservation has been recorded is placed within the reservation data, as well as a count of the number of recordings which have been performed for the reservation. This count is stored until the tape is played. Because of the above features, the viewer can determine the contents of the videotape even before playing the tape. The viewer can also tell whether he or she has missed any programs. The practical impact of the invention is therefore enormous.

What is claimed is:

1. A display device for videocassette recorder recording TV program reservation data comprising:

means for storing reservation data in memory of a videocassette recorder;

means for storing in said memory a recording sequence number with corresponding reservation data when said videocassette recorder is operated in recording mode based on said reservation data;

means for copying said reservation data from said memory to a videotape in said recording mode;

means for playing back copied reservation data when a TV program already recorded on the said videotape is played back;

means for decrementing said recording sequence number of corresponding reservation data in said memory based on said copied reservation data from said video tape; and means for displaying said reservation data and the current value of said recording sequence number which are stored in said memory.

2. A display device for videocassette recorder recording reservation data as set forth in claim 1, wherein when reservation data already used to activate VCR recording is displayed, said displayed reservation data is blinking.

3. A display device for videocassette recorder recording reservation data as set forth in claim 1, wherein reservation data used to activate VCR recording is displayed in the order that programs corresponding to reservation data have been recorded.

* * * * *